March 25, 1958 A. T. HIGH 2,828,473
EMERGENCY ELECTRICAL JUNCTION BOX
Filed Jan. 20, 1956

Angus T. High
INVENTOR

BY C. A. Snow & Co.
ATTORNEYS.

United States Patent Office 2,828,473
Patented Mar. 25, 1958

2,828,473

EMERGENCY ELECTRICAL JUNCTION BOX

Angus T. High, Washington, D. C.

Application January 20, 1956, Serial No. 560,408

1 Claim. (Cl. 339—89)

This invention relates to an emergency electrical junction box, whereby electric lights may be easily and quickly coupled together.

An object of this invention is to provide an improved junction box or connector which is of substantial T-shape in one form thereof and is provided with female connectors for receiving the bare ends of wires for electrically connecting wires together.

Another object of this invention is to provide a junction box or connector which is formed of dielectric material and is provided with embedded coupling means for coupling adjacent ends of wires together.

A further object of this invention is to provide a junction box or connector wherein the end of each wire conductor is firmly clamped or gripped relative to the connector or junction box so that the wires will not become disconnected from the connection elements which are embedded in the dielectric material forming the junction box.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing.

Figure 1:
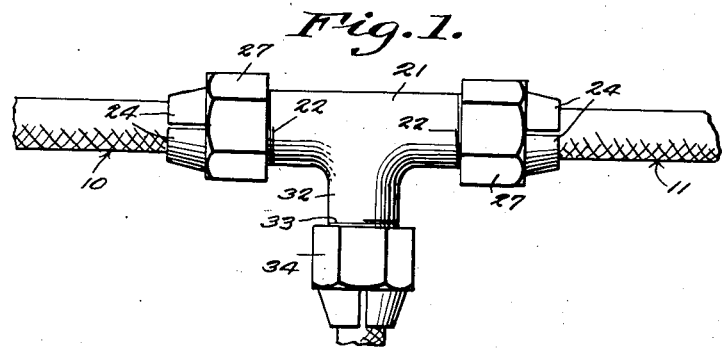
Figure 1 is a plan view of a junction box or connector constructed according to an embodiment of this invention.
Figure 2:
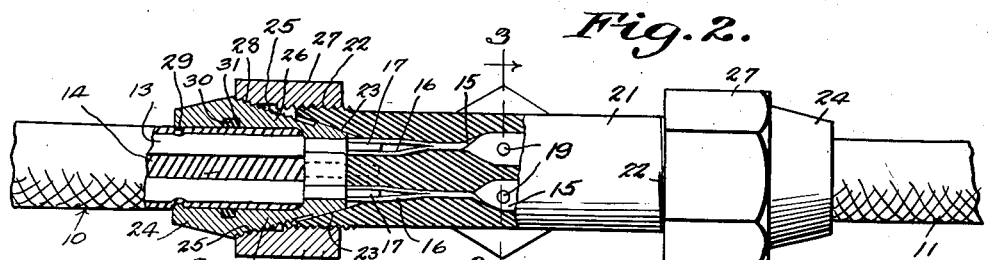
Fig. 2 is a side elevation partly broken away and in section of the device.
Figure 3:
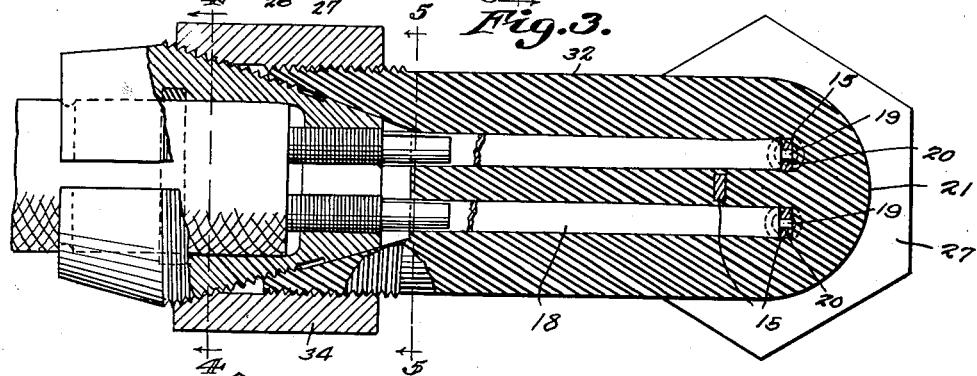
Fig. 3 is a sectional view taken on line 3—3 of Fig. 2.
Figure 4:
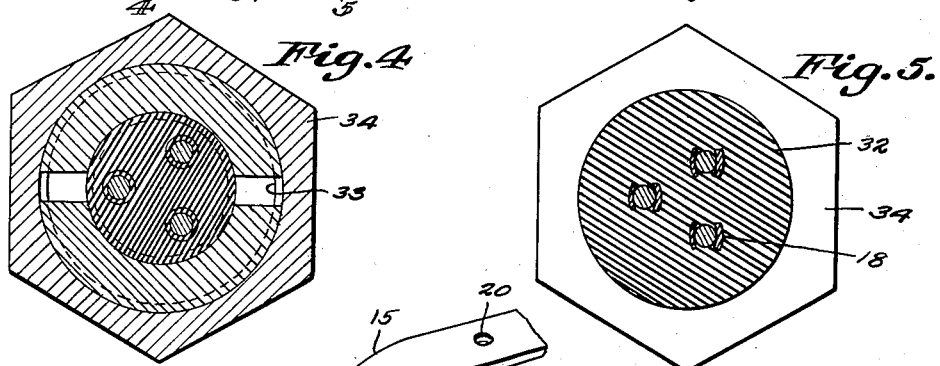
Fig. 4 is a sectional view taken on line 4—4 of Fig. 3.
Figure 5:
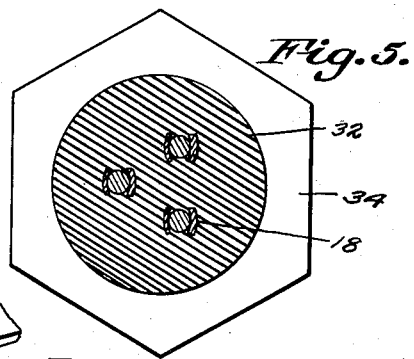
Fig. 5 is a sectional view taken on line 5—5 of Fig. 3.
Figure 6:
Fig. 6 is a fragmentary perspective view showing one of the embedded female connectors used with this device.

Referring to the drawing, the numerals 10 and 11 designate generally a pair of aligned multiwire conductors which are adapted to be electrically coupled together by means of a connector or junction box, as will be hereinafter described. The conductors 10 and 11 are of like construction and each includes a plurality of insulated conductors 13. The conductors 13 are covered by means of an outer insulating covering 14.

In order to provide a means whereby the wires 13 of conductor 10 may be electrically coupled with similar wires 13 forming conductor 11 I have provided embedded bus bars 15. Each bus bar 15 is provided with split opposite ends forming confronting transversely arcuate wire clamping jaws 16. The jaws 16 are adapted to tightly engage about the bared end 17 of conductor 13 so that the wire end 17 will be electrically coupled with a similar bared end forming part of the conductor 11. The bar 15 is flat or rectangular in transverse section and a right-angular bus bar 18 is adapted to be electrically connected with bar 15. Bar 18 is disposed at right angles to bar 15 and bar 18 is provided with a stud or pin 19 which is firmly secured in an opening 20 formed in the bar 15. The bars 15 are embedded in the dielectric body 21 which is round in transverse section and body 21 is formed with exterior threads 22 at each end thereof. The opposite ends of the body 21 are tapered or of frusto-conical configuration, as indicated at 23, forming a tapered socket within which the tapered ends of complementary conduit clamping members 24 are adapted to snugly engage. The clamping members 24 are of substantially semi-circular construction in transverse section and each clamping member 24 is provided with exterior threads 25 on the tapered inner end 26 thereof. An interiorly threaded nut 27 is adapted to engage the exterior threads 22 and nut 27 is provided with a tapered outer end having internal threads 28. The threads 28 are adapted to engage the external threads 25 so that when nut 27 is turned clockwise nut 27 will move inwardly over threads 22. Threads 25 and 28 are left hand threads so that as nut 27 moves inwardly on threads 22, clamping members 24 will be pulled inwardly in tapered socket 23 so as to tightly grip the exterior of conduit 10. Each clamping member 24 is provided with an inner rib 29 adapted to bite into the conduit 10 outwardly from the inner end thereof so as to tightly hold conduit 10 against movement within the clamping members 24. As an additional means for holding the conduit 10 within the clamping members 24, I have provided a ring-shaped yieldable member 30 in the form of a rubber ring which is engageable in a groove 31 formed on the interior of each clamping member 34. This ring 30 is adapted to be compressed when clamping members 24 are tightened about the conduit, thereby providing an additional means for holding the conduit against endwise movement with respect to the clamping members.

The dielectric body 21 as shown in Fig. 1 is formed with a right angular extension 32 within which the connectors or bus bars 18 are embedded. The extension or stem 32 is provided with exterior threads 33 similar to threads 22, and a nut 34 similar to nut 27 is threaded onto threads 33 and is adapted to clamp the conductor clamping members 24 within the socket formed in stem 32 similar to socket 23.

With a junction box or connector as hereinbefore described, the bared ends of wires may be firmly and electrically connected together and in many instances the connections may be made with a minimum of discontinuance of service and in fact in certain instances, the connection can be made without cutting off the electric service to the lines which are to be connected together.

What is claimed is:

A junction box for electric conductors comprising a plurality of elongated bars having split opposite ends, said ends being transversely curved to form confronting bare wire clamping members, a dielectric housing encompassing said bars and formed with oppositely disposed inwardly extending smooth tapered sockets, complementary pairs of clamping members engageable about the conductors and formed with threads on the outer portion of the tapered outer surfaces thereof, the unthreaded inner ends thereof extending into said inwardly extending smooth tapered sockets, external threads on each end of said housing, a nut at each end of said housing, each nut having internal threads engaging the external housing threads, each nut also having a taper extending inwardly from one end thereof with internal threads on said latter taper, whereby threading of said nut onto said housing will draw said latter named clamping members inwardly of said sockets, an internal rib carried by each of said second named clamping members for biting engagement with a conductor, each of said second named clamping members being formed with an internal arcuate groove, and a yieldable rubber ring engaging in said grooves and about said conductor.

References Cited in the file of this patent

UNITED STATES PATENTS

| | | |
|---|---|---|
| 1,710,416 | Goeller | Apr. 23, 1929 |
| 2,404,682 | Baker | July 23, 1946 |
| 2,740,098 | Phillips | Mar. 27, 1956 |